(12) United States Patent
Soh et al.

(10) Patent No.: US 9,306,488 B2
(45) Date of Patent: Apr. 5, 2016

(54) DUAL INVERTER SYSTEM AND METHOD OF CONTROLLING THE SAME

(71) Applicant: Samsung Electronics Co., Ltd., Suwon-si, Gyeonggi-do (KR)

(72) Inventors: Sang-Yoon Soh, Hwaseong-si (KR); Young-Doo Yoon, Seoul (KR); Oh-Hyuk Kwon, Suwon-si (KR); Jang-Hwan Kim, Suwon-si (KR); Jeong-Hyoun Sung, Suwon-si (KR); So-Hee Han, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 14/299,060

(22) Filed: Jun. 9, 2014

(65) Prior Publication Data
US 2015/0077030 A1    Mar. 19, 2015

(30) Foreign Application Priority Data

Sep. 17, 2013   (KR) .......................... 10-2013-0111517

(51) Int. Cl.
*H02P 29/00* (2006.01)
*H02P 27/08* (2006.01)

(52) U.S. Cl.
CPC ....................... *H02P 27/08* (2013.01)

(58) Field of Classification Search
CPC ....................................................... H02P 29/00
USPC ................................. 318/504, 400.41, 400.26
See application file for complete search history.

(56) References Cited

U.S. PATENT DOCUMENTS

| | | | |
|---|---|---|---|
| 5,414,339 A | 5/1995 | Masaki et al. | |
| 5,874,818 A * | 2/1999 | Schuurman | H02M 7/53873 318/280 |
| 6,107,774 A | 8/2000 | Yamada et al. | |
| 7,138,773 B2 * | 11/2006 | Kumar | H02M 7/493 318/400.27 |
| 7,322,065 B2 | 1/2008 | Kim et al. | |
| 7,439,697 B2 * | 10/2008 | Miyazaki | B60L 11/123 310/112 |
| 8,144,492 B2 | 3/2012 | Sakakibara | |
| 8,528,689 B2 * | 9/2013 | Uryu | B62D 5/0484 180/446 |
| 2012/0235611 A1 | 9/2012 | Kuwabara et al. | |

FOREIGN PATENT DOCUMENTS

| | | |
|---|---|---|
| JP | 2004-261275 | 9/2004 |
| JP | 2004-304926 | 10/2004 |
| JP | 3661395 | 6/2005 |
| JP | 2005-218195 | 8/2005 |
| JP | 4608741 | 1/2011 |
| JP | 2011-239515 | 11/2011 |
| KR | 1988-0013020 | 11/1988 |
| KR | 10-0282149 | 2/2001 |

* cited by examiner

*Primary Examiner* — David S Luo
(74) *Attorney, Agent, or Firm* — EIPG, PLLC

(57) ABSTRACT

A dual inverter system to drive a motor in an electronic apparatus and a method of controlling the same include a first inverter connected to one side of a stator winding of the motor to modulate a pulse width and to adjust power supplied to the motor, a second inverter connected to the other side of the stator winding of the motor to modulate a pulse width and to adjust power supplied to the motor, a first current detector connected to the first inverter to detect a current flowing in the first inverter, a second current detector connected to the second inverter to detect a current flowing in the second inverter, and a controller to control the motor by controlling a pulse-width modulation (PWM) signal applied to the first inverter or the second inverter based on the current flowing in at least one of the first inverter and the second inverter.

15 Claims, 5 Drawing Sheets

$$d^*_{a1} = \begin{bmatrix} \dfrac{V^*_a}{V^*_{DC}} & (V^*_a > 0) \\ 0 & (V^*_a > 0) \end{bmatrix}$$

$$d^*_{a2} = \begin{bmatrix} 0 & (V^*_a > 0) \\ -\dfrac{V^*_a}{V^*_{DC}} & (V^*_a < 0) \end{bmatrix}$$

DUAL INVERTER SYSTEM AND METHOD OF CONTROLLING THE SAME

CROSS-REFERENCE TO RELATED APPLICATION

This application claims priority under 35 U.S.C. §119 from Korean Patent Application No. 10-2013-0111517 filed on Sep. 17, 2013 in the Korean Intellectual Property Office, the contents of which in its entirety are herein incorporated by reference.

BACKGROUND

1. Field

The present inventive concept relates to a dual inverter system to drive a motor and a method of controlling the same.

2. Description of the Related Art

In general, an inverter converts a DC voltage into an AC voltage.

The inverter is one of power converters and is widely used in electric apparatus including home appliances, such as an air conditioner, a refrigerator, a washing machine, or a cooking machine.

An inverter driver in an electric home appliance drives a load, such as a motor, by switching a plurality of power devices in an inverter circuit based on a gate signal output from a controller.

The inverter is classified into a 2-phase electrical conduction type and a 3-phase electrical conduction type according to how many power devices are electrically conducted when a load is driven. That is, if two power devices are electrically conducted, the inverter is called a 2-phase electrical conduction type inverter, and if three power devices are electrically conducted, the inverter is called a 3-phase electrical conduction type inverter.

The power devices provided in the inverter are divided into a high side group and a low side group, and a gate signal applied to the power devices is a pulse width modulation (PWM) signal.

After the PWM signal is applied to the power devices provided in the inverter, PWM is generated based on a current sensed from an output node of the inverter. Here, a current transducer (CT) or a Hall effect sensor is used as a current sensor to sense the current of the output node. In this case, the inverter driver may have an increased cost, which is problematic.

The current of the output node of the inverter may also be sensed using a resistor and a differential amplifier. Since the differential amplifier is relatively expensive, the manufacturing cost of the inverter driver may increase.

In addition, in a case where the inverter is employed to a washing machine, in order to cope with the tendency toward large size and high efficiency washing machines, it is necessary to increase a DC terminal voltage of the inverter. However, there is a limit in increasing the DC terminal voltage because single-phase power for home use is simply rectified to be used.

Therefore, in order to increase the DC terminal voltage of the inverter, a separate power boosting converter should be used. In this case, the price of a product may increase and an energy loss may increase during power conversion.

SUMMARY

The present inventive concept provides a dual inverter system configured to sense a current of a dual inverter controlling both sides of an open winding type motor using resistors provided between a low side switching device of the dual inverter and a ground and to control driving of the dual inverter based on the sensed current, a method of controlling the dual inverter system, and a computer-readable medium to execute the method.

Additional features and utilities of the present general inventive concept will be set forth in part in the description which follows and, in part, will be obvious from the description, or may be learned by practice of the general inventive concept The forgoing and/or other features and utilities of the present general inventive concept may be achieved by providing a dual inverter system usable in an electronic apparatus, the dual inverter system including a first inverter connected to one side of a winding of a motor, to modulate a pulse width and to adjust power supplied to the motor, a second inverter connected to the other side of the winding of the motor, to modulate a pulse width and to adjust power supplied to the motor, a first current detector connected to the first inverter to detect a current flowing in the first inverter, a second current detector connected to the second inverter to detect a current flowing in the second inverter, and a controller to control the motor by controlling a pulse-width modulation (PWM) signal applied to the first inverter or the second inverter based on the current flowing in at least one of the first inverter and the second inverter.

The forgoing and/or other features and utilities of the present general inventive concept may also be achieved by providing a method of controlling a dual inverter system including a first inverter and a second inverter to drive a motor, the method including, if a reference value of the phase voltage applied to the motor is a positive value, switching-controlling the switching devices of the first inverter and ON-controlling second low side switching devices of the second inverter, if a reference value of the phase voltage applied to the motor is a negative value, switching-controlling the switching devices of the second inverter and ON-controlling second low side switching devices of the first inverter, selecting a current flowing in the resistors connected to the ON-controlled low side switching devices, and PWM-controlling based on the selected current and a target current.

The forgoing and/or other features and utilities of the present general inventive concept may also be achieved by providing a computer-readable medium containing computer-readable medium as a program to execute a method described above or hereinafter.

The current flowing in the dual inverter system can be sensed using only a resistor without a differential amplifier and additional circuits.

The forgoing and/or other features and utilities of the present general inventive concept may also be achieved by providing a dual inverter system to drive a motor in an electronic apparatus, the dual inverter system including a first inverter and a second inverter connected between voltage lines and each connected to opposite contacts of the motor, respectively, a first current detector and a second current detector disposed to detect a current flowing between one of the voltages lines and the first and second inverters, respectively, and a controller to control a PWM operation on the first inverter when performing an ON operation on switching devices of the second inverter connected to the one voltage line, and to control a PWM operation on the second inverter when performing an ON operation on switching devices of the first inverter connected to the one voltage line, according to the detected current and a target current.

The first inverter and the second inverter each may include high side switching devices and low side switching devices, and the switching devices of the first inverter and the switching devices of the second inverter may be the low side switching devices of the first inverter and the low side switching devices of the second inverter, respectively.

The motor may include three windings each having the opposite contacts. The first inverter and second converter each may include pairs of switching devices connected between the voltage lines, one of the opposite contacts may be connected to a contact between each pair of switching devices of the first inverter, and the other one of the opposite contacts may be connected to a contact between each pair of switching devices of the second inverter.

The first current detector and the second current detector each may include a resistor connected between the one voltage line and the respective switching devices.

The first current detector and the second detector each may detect the current at a contact between the resistor and the respective switching devices such that the detected current is lower than another current at another contact between the voltage lines.

The dual inverter system may further include a PWM generator to generate a PWM signal to the first inverter or the second inverter to perform the PWM operation.

The PWM generator may generate a constant signal to the first inverter or the second inverter during a phase corresponding to the ON operation such that the switching devices of the first inverter or the second inverter are on.

The first current detector and the second current detector may detect the current from the first inverter and the second inverter during the PWM operation and the ON operation.

The controller may adjust a PWM signal corresponding to the PWM operation and a duration of the ON operation on the first inverter and the second inverter according to the detected current from the first inverter and the second inverter.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
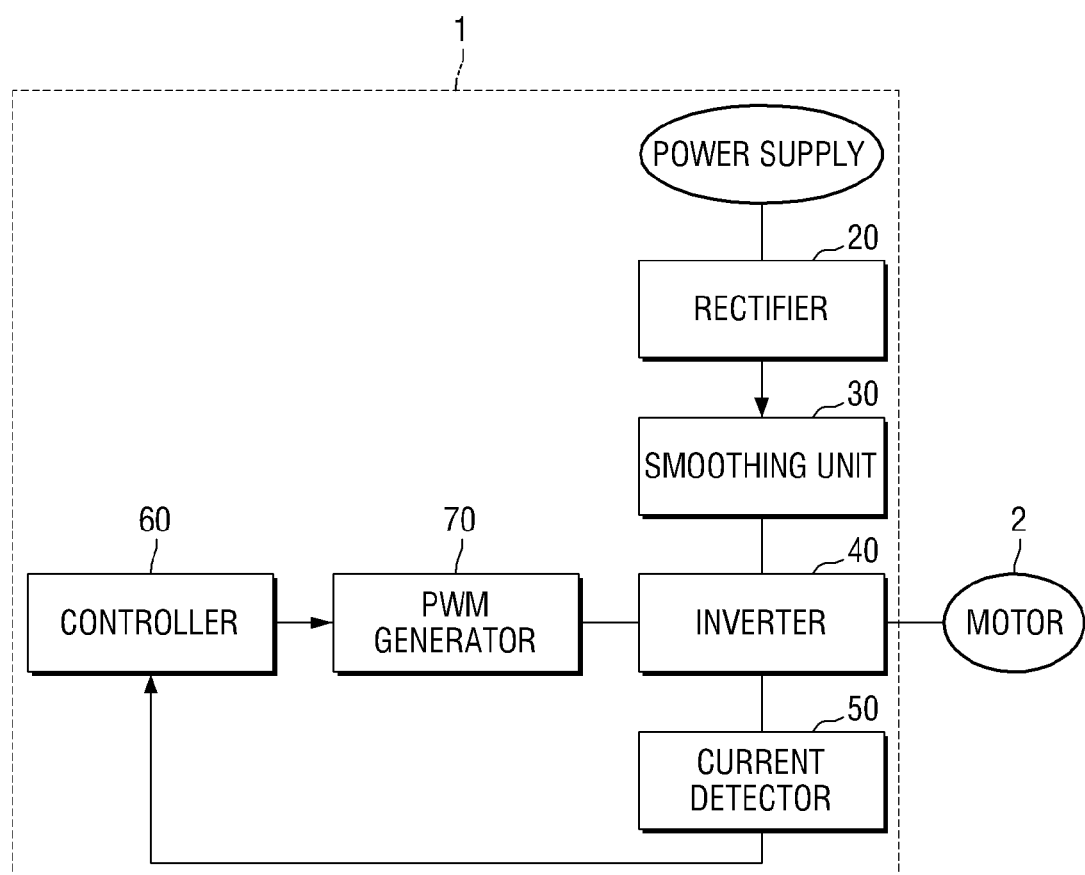
FIG. 1 is a schematic diagram illustrating a dual inverter system usable in an electronic apparatus according to an embodiment of the present inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concept.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Hereinafter, a dual inverter system according to an embodiment of the present inventive concept will be described with reference to the accompanying drawing.

FIG. 1 is a schematic diagram illustrating a dual inverter system 1 usable in an electronic apparatus according to an embodiment of the present inventive concept. The electronic apparatus may be an apparatus having one or more components thereof to be driven by the dual inverter system 1. The electronic apparatus may be a home appliance, for example, a washing machine. However, the present general inventive concept is not limited thereto. It is possible that the dual inverter system can be usable as an inverter to drive a motor of an electronic apparatus.

The dual inverter system 1 transmits a driving signal to the motor 2 to drive the motor 2 and includes a power supply 10, a rectifier 20, a smoothing unit 30, an inverter 40, a current detector 50, a controller 60, and a PWM generator 70.

The power supply 10 is connected to an external power supply, for example, an external commercial power, and supplies power to a load of the electronic apparatus, for example, a motor, when the external commercial power is applied.

The rectifier 20 is connected between the power supply 10 and the smoothing unit 30, receives and rectifies an AC power input from the power supply 10 and outputs the rectified power to the smoothing unit 30.

In order to reduce fluctuation of a power voltage rectified in the rectifier 20, the smoothing unit 30 smoothes the power voltage and outputs a DC power having a predetermined magnitude to drive the motor.

The inverter 40 receives the DC power from the smoothing unit 30, converts a voltage and frequency of the received DC power to generate an AC power and supplies the generated AC power to the motor 2.

The inverter 40 may include two inverters to be respectively connected to one side of the motor 2 to apply a voltage to the motor 2 and to the other side of the motor 2 to apply a voltage having a different voltage from the voltage applied from the first inverter 41 to the motor 2, which will now be described with reference to FIG. 2. The motor 2 may be an open wing type motor 2. However, the present general inventive concept is not limited thereto. The motor 2 may be a motor having a type different from the open wing type.

Figure 2:
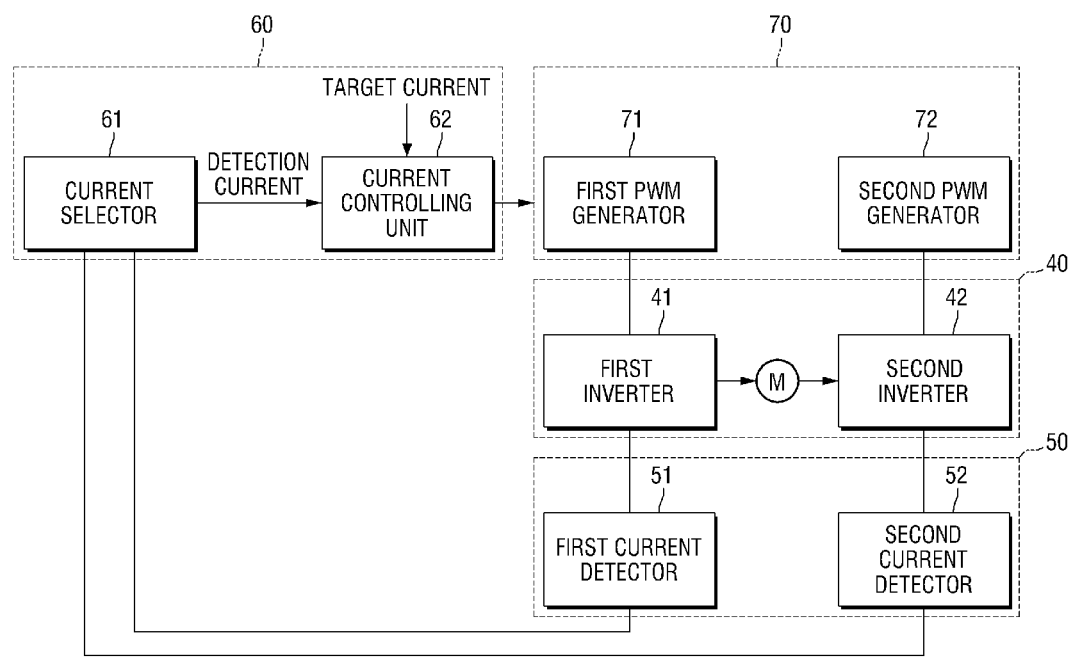
FIG. 2 is a detailed schematic diagram illustrating the dual inverter system of FIG. 1.

FIG. 2 illustrates a detailed schematic diagram of the dual inverter system 1 of FIG. 1.

The inverter may include a first inverter 41 and a second inverter 42 to be connected to the PWM generator 70 to generate an AC power based on a PWM signal output from the PWM generator 70.

The first inverter 41 and the second inverter 42 of the inverter 40 convert a frequency and voltage of a DC power based on the PWM signal output from the PWM generator 70.

Here, a rotation speed and a rotation torque of the motor 2 may vary according to the converted frequency and voltage of the DC power.

The current detector 50 includes a first current detector 51 connected to the first inverter 41 and/or disposed to detect a phase current of the motor 2 and a second current detector 52 connected to the second inverter 42 and/or disposed to detect a phase current of the motor 2.

The first current detector 51 and the second current detector 52 of the current detector 50 transmit the respective detection currents to the controller 60.

The controller 60 generates 3-phase voltage references of the motor 2 based on a target speed, a target torque, and/or a difference between a target current and each of the detection current.

The controller 60 includes a current selector 61 to detect at least one of a plurality of detection currents applied from the first current detector 51 and the second current detector 52 according to the polarity of a voltage applied to the motor 2 and a kind of its phase, and a current controlling unit 62 to adjust a target current based on the detection current selected from the current selector 61.

The current selector 61 of the controller 60 selects a current applied from a resistor connected to an ON-controlled low side switching device. Here, the ON-controlled low side switching device is referred to a low side switching device controlled to be turned-on to an operation state.

The controller 60 determines occurrence of a fault event of each switch pair, such as an over-current or an arm-short, based on the phase current, thereby reinforcing the safety of the dual inverter system 1.

If a reference value of a phase voltage applied to the motor 2 is a positive (+) value, the PWM generator 70 switching-controls switching devices of the first inverter 41 and ON-controls second low side switching devices of the second inverter 42 while OFF-controlling second high side switching devices of the second inverter 42.

Here, the switching-controlling of the switching devices is referred to controlling the switching devices to be an operating (operable) state, and the PWM generator controls the low and high side switching devices to be an operable state. The OFF-controlling is referred to controlling to turn off the corresponding device to a non-operable state, and the ON-controlling is referred to controlling to turn on the corresponding device to an operable state.

The PWM generator 70 may generate a signal for the switching controlling, a signal for the OFF-controlling, and/or a signal for the ON-controlling to the inverter 40 to be applied to the inverter 40 according to respective phases thereof.

If a reference value of the phase voltage applied to the motor is a negative (−) value, the PWM generator 70 switching-controls the switching devices of the second inverter 42 and ON-controls low side switching devices of the first inverter 41 while OFF-controlling high side switching devices of the first inverter 41.

The PWM generator 70 includes a first PWM generator 71 to output signals, for example, on/off signals to the switching devices of the first inverter 41, and a second PWM generator 72 to output signals, for example, on/off signals to the switching devices of the second inverter 42.

A circuit configuration of the dual inverter system 1 will now be described with reference to FIG. 3.

The rectifier 20 is connected to both power terminals PS1 and PS2 of the power supply 10.

The rectifier 20 includes a plurality of diodes D1 to D4.

The plurality of diodes D1 to D4 include two pairs of diodes (D1 and D2 as a pair, and D3 and D4 as a pair) connected in series, forming bridge diodes.

The power terminals PS1 and PS2 are respectively connected to contacts between two series-connected diodes. A capacitor, the first inverter 41 and the second inverter 42 are connected between contacts (terminals) R1 and R2 of the two pairs of series-connected diodes, which will now be described in more detail.

In the rectifier 20, a cathode of the second diode D2 is connected to an anode of the first diode D1 in series, and one terminal PS1 of the power supply 10 is connected to a contact between the anode of the first diode D1 and the cathode of the second diode D2.

In the rectifier 20, a cathode of the fourth diode D4 is connected to an anode of the third diode D3 in series, and the other terminal PS2 of the power supply 10 is connected to a contact between the anode of the third diode D3 and the cathode of the fourth diode D4.

Here, the one terminal PS1 of the power supply 10 or the one terminal R1 of the rectifier 20 may be referred to as a positive voltage terminal and the other terminal PS1 of the power supply 10 or the other terminal R2 of the rectifier 20 may be referred to as a negative voltage terminal.

In addition, in the rectifier 20, a cathode of the first diode D1 and a cathode of the third diode D3 are connected to each other, an anode of the second diode D2 and an anode of the fourth diode D4 are connected to each other, a pair of series-connected first and second diodes D1 and D2 and a pair of series-connected third and fourth diodes D3 and D4 are connected to each other in parallel between the terminals R1 and R2.

In addition, the capacitor of the smoothing unit 30 is connected between the terminals R1 and R2.

The smoothing unit 30 includes at least one capacitor to smooth a power input from the rectifier 20.

The inverter 40 includes the first inverter 41 to perform a switching operation when a positive voltage is applied, and the second inverter 42 to perform a switching operation when a negative voltage is applied. Here, the positive voltage and the negative voltage are referred to as a positive and negative voltage level of the power supply 10 or a voltage level usable in the dual inverter system 1 to drive the motor 2. The switching may be referred to as selectively turning on and off the switching devices of the inverter 40 to an operable state and a non-operable state.

The first inverter 41 includes first high side switching devices S1, S2 and S3 each having a collector connected to one terminal of the capacitor, and first low side switching devices S4, S5 and S6 each having a collector connected to each of emitters of the plurality of first high side switching devices S1, S2 and S3 and an emitter connected to each of a plurality of resistors of the first current detector 51.

Here, gates of the first high side switching devices S1, S2 and S3 and the first low side switching devices S4, S5 and S6 are connected to the PWM generator 70 to receive the on/off driving signals from the PWM generator 70.

The collector of the fourth switching device S4 is connected to the emitter of the first switching device S1, the collector of the fifth switching device S5 is connected to the emitter of the second switching device S2, and the collector of the sixth switching device S6 is connected to the emitter of the third switching device S3.

In addition, a first resistor R11 is connected to the emitter of the fourth switching device S4, a second resistor R12 is connected to the emitter of the fifth switching device S5, and a third resistor R13 is connected to the emitter of the sixth switching device S6.

The plurality of first high side switching devices S1, S2 and S3 and the plurality of first low side switching devices S4, S5 and S6 are in pairs, respectively.

The first high side switching device S1 and the first low side switching device S4 constitute a first switch pair, the first high side switching device S2 and the first low side switching device S5 constitute a second switch pair, and the first high side switching device S3 and the first low side switching device S6 constitute a third switch pair.

The plurality of first high side switching devices S1, S2 and S3 may further include freewheeling diodes each having a cathode connected to the collector of the corresponding switching device S1, S2 or S3 and an anode connected to the emitter of the corresponding switching device S1, S2 or S3.

In addition, the plurality of first low side switching devices S4, S5 and S6 may also further include freewheeling diodes each having a cathode connected to the collector of the corresponding switching device S4, S5 or S6 and an anode connected to the emitter of the corresponding device S4, S5 or S6.

The second inverter 42 include second high side switching devices T1, T2 and T3 each having a collector connected to one terminal of the capacitor, and second low side switching devices T4, T5 and T6 each having a collector connected to each of emitters of the plurality of second high side switching devices T1, T2 and T3 and an emitter connected to each of a plurality of resistors of the second current detector 52.

Here, gates of the second high side switching devices T1, T2 and T3 and the second low side switching devices T4, T5 and T6 are connected to the PWM generator 70 to receive on/off driving signals from the PWM generator 70.

The collector of the fourth switching device T4 is connected to the emitter of the first switching device T1, the collector of the fifth switching device T5 is connected to the emitter of the second switching device T2, and the collector of the sixth switching device T6 is connected to the emitter of the third switching device T3.

In addition, the plurality of second high side switching devices T1, T2 and T3 may further include freewheeling diodes each having a cathode connected to the collector of the corresponding switching device T1, T2 or T3 and an anode connected to the emitter of the corresponding switching device T1, T2 or T3.

In addition, the plurality of second low side switching devices T4, T5 and T6 may also further include freewheeling diodes each having a cathode connected to the collector of the corresponding switching device T4, T5 or T6 and an anode connected to the emitter of the corresponding switching device T4, T5 or T6.

In addition, a fourth resistor R21 is connected to the emitter of the fourth switching device T4, a fifth resistor R22 is connected to the emitter of the fifth switching device T5, and a sixth resistor R23 is connected to the emitter of the sixth switching device T6.

The plurality of second high side switching devices T1, T2 and T3 and the plurality of first low side switching devices T4, T5 and T6 are in pairs, respectively.

The second high side switching device T1 and the second low side switching device T4 constitute a fourth switch pair, the second high side switching device T2 and the second low side switching device T5 constitute a fifth switch pair, and the second high side switching device T3 and the second low side switching device T6 constitute a sixth switch pair.

The first switch pair and the fourth switch pair constitute a first phase switch group usable to apply a voltage to an a-phase winding of the motor 2, the second switch pair and the fifth switch pair constitute a second phase switch group usable to apply a voltage to a b-phase winding of the motor 2, and the third switch pair and the sixth switch pair constitute a third phase switch group usable to apply a voltage to a c-phase winding of the motor 2.

The switch devices of the first and second inverters 41 and 42 may be an IGBT, a MOSFET or an NPN type transistor.

The current detector 50 includes the first current detector 51 connected between the first inverter 41 and a negative voltage terminal R2 to detect a current when a negative voltage is applied to the motor 2, and the second current detector 52 connected between the second inverter 42 and the negative voltage terminal R2 to detect a current when a positive voltage is applied to the motor 2, and the first current detector 51 and the second current detector 52 transmits the detection current to the controller 60.

The first current detector 51 includes the plurality of resistors R11, R12 and R13.

The plurality of resistors R11, R12 and R13 may be referred to as first, second and third resistors, respectively, connected between the emitters and the negative voltage terminals R2 of the plurality of first low side switching devices.

The first current detector 51 includes the first resistor R11 connected between the emitter of the fourth switching device S4 and the negative voltage terminal of the first inverter 41, the second resistor R12 connected between the emitter of the fifth switching device S5 and the negative voltage terminal, and the third resistor R13 connected between the emitter of the sixth switching device S6 and the negative voltage terminal.

The first current detector 51 detects an a-phase current flowing in the a-phase winding using the first resistor R11 when a voltage is applied to the a-phase winding, detects a b-phase current flowing in the b-phase winding using the second resistor R12 when a voltage is applied to the b-phase winding, and detects a c-phase current flowing in the c-phase winding using the third resistor R13 when a voltage is applied to the c-phase winding.

The second current detector 52 includes the plurality of resistors R21, R22 and R23.

The plurality of resistors R21, R22 and R23 include the fourth, fifth and sixth resistors R21, R22 and R23 connected between the emitters and negative voltage terminals R2 of the plurality of first low side switching devices, respectively.

The second current detector 52 includes the fourth resistor R21 connected between the emitter of the fourth switching device T4 and the negative voltage terminal R2 of the first inverter 41, the fifth resistor R22 connected between the emitter of the fifth switching device T5 and the negative voltage terminal R2, and the sixth resistor R23 connected between the emitter of the sixth switching device T6 and the negative voltage terminal.

The second current detector 52 detects the a-phase current flowing in the a-phase winding using the fourth resistor R21 when a voltage is applied to the a-phase winding, detects the b-phase current flowing in the b-phase winding using the fifth resistor R22 when a voltage is applied to the b-phase winding, and detects the c-phase current flowing in the c-phase winding using the sixth resistor R23 when a voltage is applied to the c-phase winding.

As described above, phase currents are detected using resistors connected between low side switching devices of two switch pairs and a negative voltage terminal thereof. Accordingly, low-priced resistors can be useable as the resistors, and thus, the cost-effectiveness is significantly high, as compared to a case when a high-priced current sensor, such as a current transducer (CT), is used.

In addition, the motor 2 rotates by the power applied from the first inverter 41 and the second inverter 42.

The motor 2 is a 3-phase motor of a, b and c phases, but may also be implemented as a 2-phase motor.

The motor 2 may include the a-phase winding, the b-phase winding, and the c-phase winding.

Voltages are applied to the motor 2 through opposite terminals (or opposite contacts) P1 and P2 of the a-phase winding, opposite terminals P1 and P2 of the b-phase winding and opposite terminals P1 and P2 of the c-phase winding, respectively, and currents flow through the a-phase winding, the b-phase winding and the c-phase winding, respectively.

The opposite terminals P1 and P2 of the a-phase winding of the motor 2 are respectively connected to a contact between the first switching device S1 and the fourth switching device S4 of the first inverter 41 and a contact between the first switching device T1 and the fourth switching device T4 of the second inverter 42.

The opposite terminals P1 and P2 of the b-phase winding of the motor 2 are respectively connected to a contact between the second switching device S2 and the fifth switching device S5 of the first inverter 41 and a contact between the second switching device T2 and the fifth switching device T5 of the second inverter 42.

The opposite terminals P1 and P2 of the c-phase winding of the motor 2 are respectively connected to a contact between the third switching device S3 and the sixth switching device S6 of the first inverter 41 and a contact between the third switching device T3 and the sixth switching device T6 of the second inverter 42.

The motor 2 rotates by the power applied through the opposite terminals P1 and P2 of each of the a-phase winding, the b-phase winding and the c-phase winding.

Figure 4:
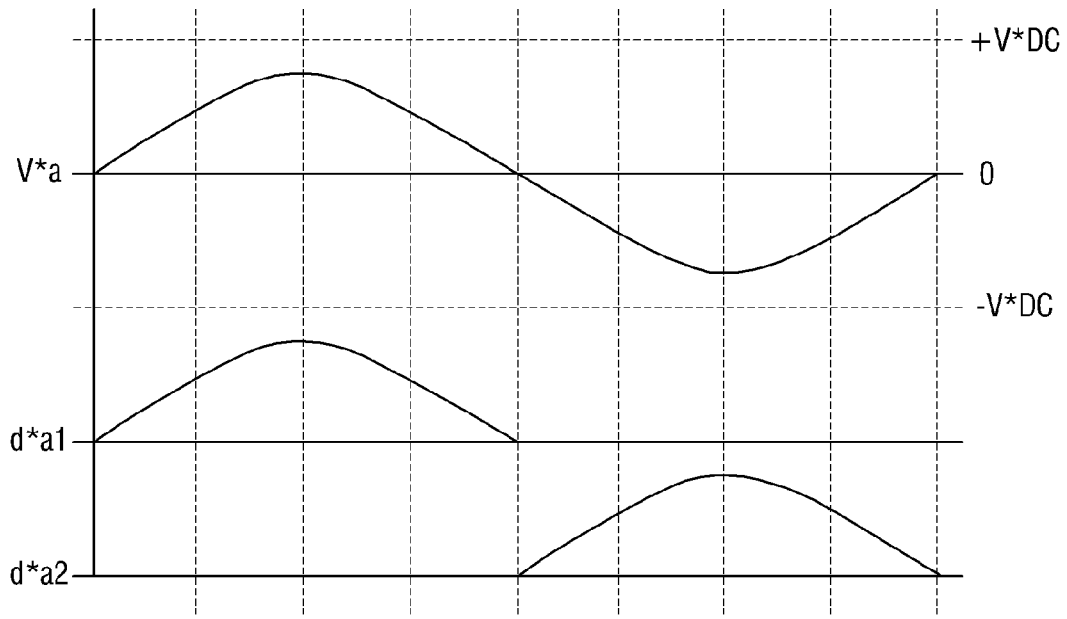
FIG. 4 illustrates an example of a phase voltage of the dual inverter system of FIG. 1.
Figure 5:
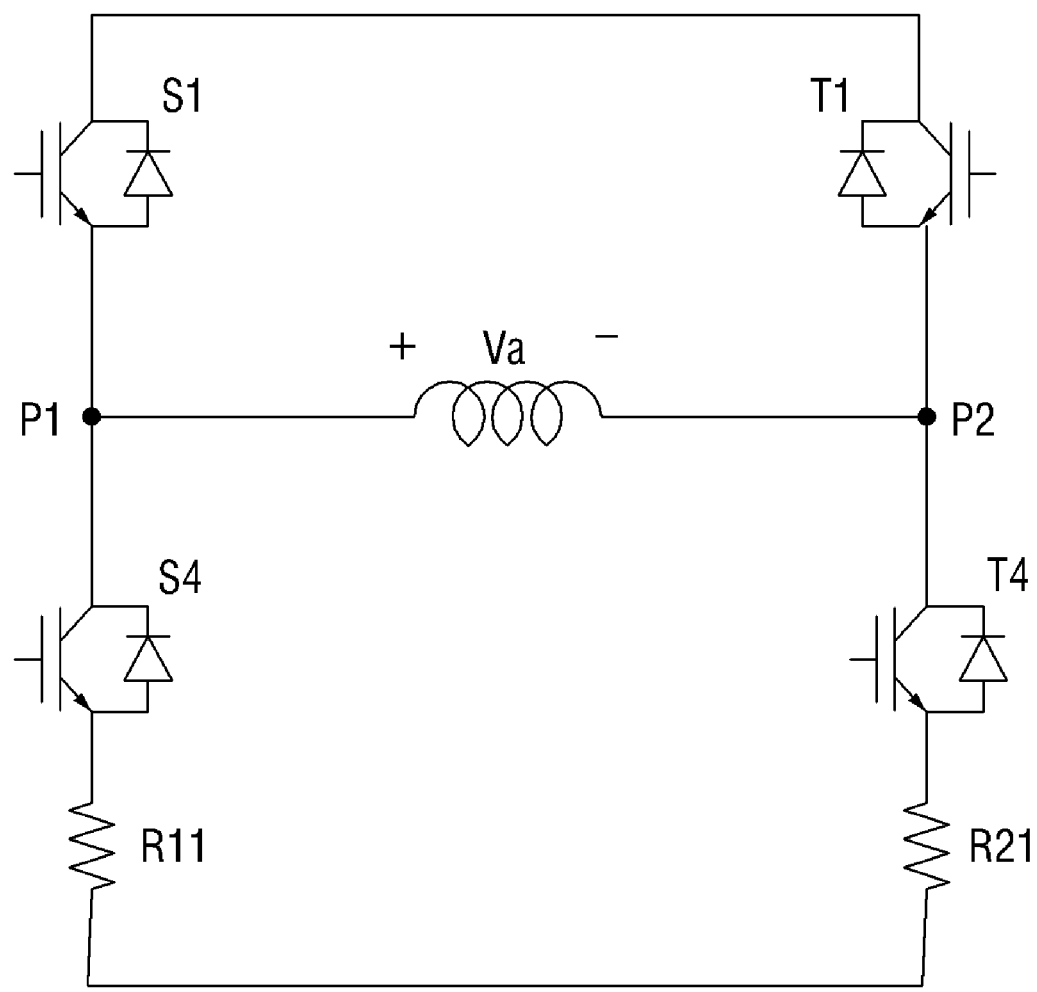
FIG. 5 illustrates an example operation of a switching device of the dual inverter system of FIG. 1.

A current detecting method using the dual inverter system 1 of FIG. 1 will be described with reference to FIGS. 4 and 5. Hereinafter, a first input terminal is referred to as one of the opposite terminals P1 and P2 of each phase winding of the motor 2 to be connected to the first inverter 41, and a second input terminal is referred to as the other one of the opposite terminals P1 and P2 of each phase winding of the motor 2 to be connected to the second inverter 42. FIGS. 4 and 5 illustrate an operation on one of the windings of the motor 2, as an example.

Figure 3:
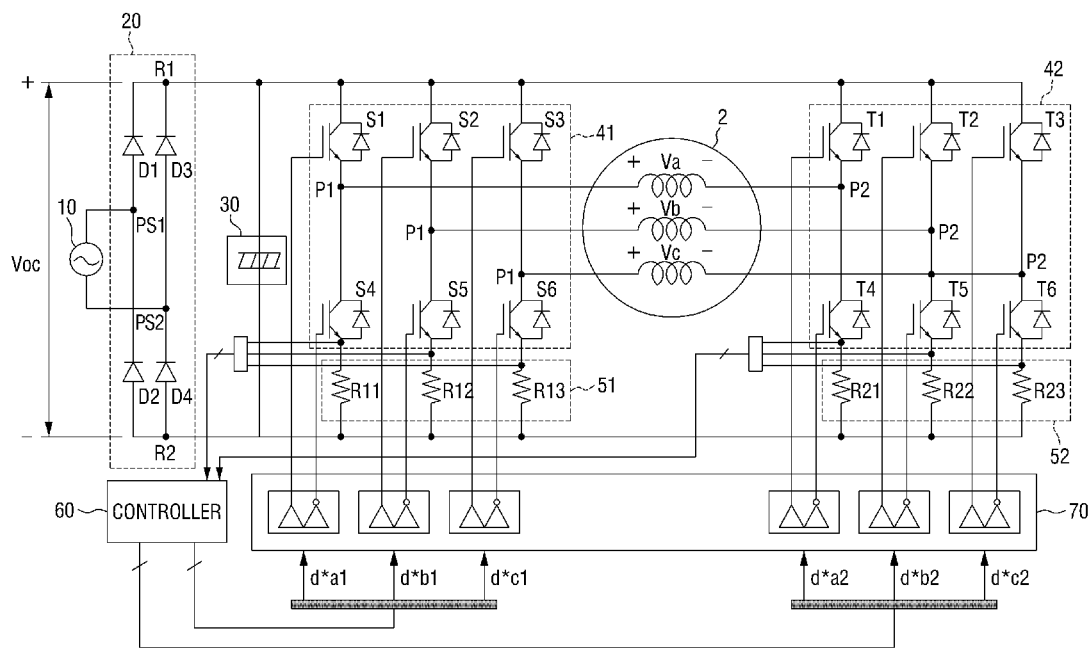
FIG. 3 is a circuit diagram illustrating the dual inverter system of FIG. 1.

Referring to FIGS. 3 and 4, if a voltage V*a to be applied to the first input terminal and the second input terminal of the a-phase winding of the motor 2 is a positive (+) voltage, the high side switching device is OFF-controlled and the low side switching device is ON-controlled by the switch pair of the second inverter 42 to drive a right node of the a-phase winding, and also switching of only a duty ratio da1 of the switch pair of the first inverter 41 to drive a left node of the a-phase winding is controlled. The first and second PWM generators 71 and 72 may include a non-converter and a converter to correspond to the ON-control, the OFF control, and the switching control according to the voltage to be applied to the corresponding winding.

Referring to FIG. 5, the high side switching device T1 of the second inverter 42 is OFF-controlled and the low side switching device T4 is ON-controlled, and the switching devices S1 and S4 of the first inverter 41 is switching-controlled.

The voltage d*a1 is applied to the a-phase winding only by the switching devices S1 and S4 of the first inverter 41 (see FIG. 4).

Here, a phase current is obtained from the resistor R21 connected to the low side switching device T4 of the second inverter 42.

As described above, since the low side switching device T4 of the second inverter 42 is always in an ON state, effective current information can be obtained from the resistor R21 at any time and is not restricted by the switching duty of the switching devices S1 and S4 of the first inverter 41.

In addition, the phase current can also be obtained from the resistor R11 connected to the low side switching device S4 of the first inverter 41.

When a voltage Va to be applied to the a-phase winding of the motor 2 is a negative (−) voltage, the high side switching device is OFF-controlled and the low side switching device is ON-controlled by the switch pair of the first inverter 41 to drive a left node of the a-phase winding, and only a duty ratio da2 of the switch pair of the second inverter 42 to drive a right node of the a-phase winding is switching-controlled.

Referring to FIG. 5, the high side switching device S1 of the first inverter 41 is OFF-controlled, the low side switching device S4 of the first inverter 41 is ON-controlled, and the switching devices T1 and of the second inverter 42 are switching-controlled. Here, the voltage d*a2 is applied to the a-phase winding using only the switching devices T1 and T4 of the second inverter 42 (see FIG. 4).

Here, a phase current is obtained from the resistor R11 connected to the low side switching device S4 of the first inverter 41.

As described above, since the low side switching device S4 of the first inverter 41 is always in an ON state, effective current information can be obtained from the resistor R11 at any time and is not restricted by the switching duty of the switching devices T1 and T4 of the second inverter 42.

In addition, the phase current can also be obtained from the resistor R21 connected to the low side switching device T4 of the second inverter 42.

The a-phase current detected when a voltage is applied to the a-phase winding can be detected by the resistor R11 of the first current detector 51 and the resistor R21 of the second current detector 52, and a detection current to be used for motor control or fault determination is selected by the current selector 61 from the currents detected by the resistor R11 of the first current detector 51 and the resistor R21 of the second current detector 52.

As described above, while the switching devices S1 and S4 of the first inverter 41 are maintained in OFF and ON states, respectively, the voltage is applied to the a-phase winding just by switching the switching devices T1 and T4 of the second inverter 42.

In addition, while the switching devices T1 and T4 of the second inverter 42 are always maintained in OFF and ON states, respectively, the voltage is applied to the a-phase winding just by switching the switching devices S1 and S4 of the first inverter 41. That is, when the phase voltages are a positive (+) voltage and a negative (−) voltage, switching of only the switch pairs is performed, thereby minimizing a switching loss or a power loss.

Considering that a general switching frequency used in a digital inverter of a washing machine is a few kilohertz (kHz) level, the minimized switching loss is a significantly meaningful advantage in that system performance is considerably enhanced and material costs can be minimized by reducing heat radiating devices.

In addition, since the electric washing machine is likely to be exposed to a low-voltage environment in an unstable power supply area and the inverter power voltage Vdc can be used with a maximized utilization efficiency, for example, 100%, voltage availability can be increased, which is significantly meaningful in that the performance of the electric washing machine can be improved even under a low-voltage situation.

The current flowing in the dual inverter system can be sensed using only a resistor without a differential amplifier and additional circuits to lower costs thereof and reduce an system incorporating apparatus. The dual inverter system may detect a fault, such as an arm short of an inverter switch, as well as a current flowing in the dual inverter system, using only the resistor in the dual inverter system. In addition, a problem associated with the inability to use 100% switching duty, which may occur when a resistor is used as a current sensor at a low side of the inverter restraint, can be overcome, thereby reducing a switching loss. That is to say, the inverter power can be fully (100%) utilized as the output. Further, the use of the dual inverter system as a motor driver of a washing machine can increase the capacity and efficiency of the washing machine.

As describe above, the dual inverter system 1 to drive the motor 2 in an electronic apparatus may include a first inverter and a second inverter connected between voltage lines (or contacts R1 and R2) and connected to a first contact P1 and a second contact P2 of each of windings of the motor 2, respectively, a first current detector and a second current detector disposed to detect a current flowing between the one voltages line and the first and second inverters 41 and 42, respectively, and a controller 60 to control a PWM operation on the first inverter 41 when switching devices of the second inverter 42 connected to the one voltage line is on, and to control a PWM operation on the second inverter 42 when switching devices of the first inverter 41 connected to the one voltage line is on.

As described above, the dual inverter system 1 may include the first inverter 41 and the second inverter 42 to drive the motor 2 in an electronic apparatus, and the method may include switching-controlling switching devices S1 through S6 of the first inverter 41 and ON-controlling second low side switching devices T4, T5, and T6 of the second inverter 42 when a reference value of a phase voltage to be applied to the motor is a positive value, switching-controlling switching devices T1 through T6 of the second inverter 42 and ON-controlling second low side switching devices S4, S5, and S6 of the first inverter 41 when a reference value of the phase voltage to be applied to the motor 2 is a negative value, selecting a current flowing in resistors connected to the ON-controlled low side switching devices S4, S5, and S6 and/or T4, T5, and T6, and PWM-controlling the switching-controlled switching devices based on the selected current and a target current.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory, a read-only memory (ROM), a random-access memory (RAM), a USB memory, a memory card, a blue-ray disc, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A dual inverter system to drive a motor in an electronic apparatus, the dual inverter system comprising:
a first inverter connected to one side of a winding of the motor to modulate a pulse width and to adjust power supplied to the motor;
a second inverter connected to the other side of the winding of the motor to modulate a pulse width and to adjust power supplied to the motor;
a first current detector connected to the first inverter to detect a current flowing in the first inverter;
a second current detector connected to the second inverter to detect a current flowing in the second inverter; and
a controller to control the motor by controlling a pulse-width modulation (PWM) signal applied to the first inverter or the second inverter based on the current flowing in at least one of the first inverter and the second inverter.

2. The dual inverter system of claim 1, wherein the first inverter includes a plurality of first high side switching devices and a plurality of first low side switching devices connected to emitters of the plurality of first high side switching devices, respectively, and the second inverter includes a plurality of second high side switching devices and a plurality of second low side switching devices connected to emitters of the plurality of second high side switching devices, respectively.

3. The dual inverter system of claim 2, wherein the first current detector includes a plurality of resistors connected between the plurality of first low side switching devices and a ground, respectively, and the second current detector includes a plurality of resistors connected between the plurality of second low side switching devices and the ground, respectively.

4. The dual inverter system of claim 3, wherein if a reference value of a phase voltage applied to the motor is a positive value, the PWM generator switching-controls the first high and low side switching devices of the first inverter and ON-controls the second low side switching devices of the second inverter, and if a reference value of the phase voltage applied to the motor is a negative value, the PWM generator switching-controls the second high and low side switching devices of the second inverter and ON-controls the second low side switching devices of the first inverter.

5. The dual inverter system of claim 4, wherein the controller includes a current selector to select a current flowing in at least one resistor connected to the ON-controlled low side switching devices, and a current controlling unit to compare the selected current with a target current and to generate a phase voltage reference.

6. The dual inverter system of claim 2, wherein pairs of the high side switching devices and the low side switching devices of the first inverter and pairs of the high side switching devices and the low side switching devices of the second inverter correspond to the number of phases of the motor.

7. A dual inverter system to drive a motor in an electronic apparatus, the dual inverter system comprising:
a first inverter and a second inverter connected between voltage lines and each connected to opposite contacts of the motor, such that the first and second inverters are connected to opposite sides of a winding of the motor, respectively;
a first current detector and a second current detector disposed to detect a current flowing between one of the voltages lines and the first and second inverters, respectively; and
a controller to control a PWM operation on the first inverter when performing an ON operation on switching devices of the second inverter connected to the one voltage line, and to control a PWM operation on the second inverter when performing an ON operation on switching devices of the first inverter connected to the one voltage line, according to the detected current and a target current.

8. The dual inverter system of claim 7, wherein:
the first inverter and the second inverter each comprise high side switching devices and low side switching devices; and
the switching devices of the first inverter and the switching devices of the second inverter are the low side switching devices of the first inverter and the low side switching devices of the second inverter, respectively.

9. The dual inverter system of claim 7, wherein:
the motor comprises three windings each having the opposite contacts;
the first inverter and second converter each comprise pairs of switching devices connected between the voltage lines;
one of the opposite contacts is connected to a contact between each pair of switching devices of the first inverter; and
the other one of the opposite contacts is connected to a contact between each pair of switching devices of the second inverter.

10. The dual inverter system of claim 7, wherein the first current detector and the second current detector each comprise a resistor connected between the one voltage line and the respective switching devices.

11. The dual inverter system of claim 10, wherein the first current detector and the second detector each detects the current at a contact between the resistor and the respective switching devices such that the detected current is lower than another current at another contact between the voltage lines.

12. The dual inverter system of claim 7, further comprising;
a PWM generator to generate a PWM signal to the first inverter or the second inverter to perform the PWM operation.

13. The dual inverter system of claim 12, wherein the PWM generator generates a constant signal to the first inverter or the second inverter during a phase corresponding to the ON operation such that the switching devices of the first inverter or the second inverter are on.

14. The dual inverter system of claim 7, wherein the first current detector and the second current detector detect the current from the first inverter and the second inverter during the PWM operation and the ON operation.

15. The dual inverter system of claim 14, wherein the controller adjusts a PWM signal corresponding to the PWM operation and a duration of the ON operation on the first inverter and the second inverter according to the detected current from the first inverter and the second inverter.

* * * * *